US012498689B2

United States Patent
Schöni et al.

(10) Patent No.: US 12,498,689 B2
(45) Date of Patent: Dec. 16, 2025

(54) VIRTUALIZED PROGRAMMABLE LOGIC CONTROLLERS TO ALLOW MULTIPLE APPLICATIONS TO RUN IN PARALLEL ON THE SAME HARDWARE

(71) Applicant: SELECTRON SYSTEMS AG, Lyss (CH)

(72) Inventors: Ulrich Schöni, Ittigen (CH); Bernhard Geissbühler, Lyss (CH); Christoph Felser, Murten (CH); Joachim Lillich, Oberdorf (CH); Jonathan Orditz, Sonceboz-Sombeval (CH); Martin Kurth, Lohn-Ammannsegg (CH); Ralph Martig, Bern (CH)

(73) Assignee: SELECTRON SYSTEMS AG (CH)

( * ) Notice: Subject to any disclaimer, the term of this patent is extended or adjusted under 35 U.S.C. 154(b) by 742 days.

(21) Appl. No.: 15/734,113

(22) PCT Filed: May 23, 2019

(86) PCT No.: PCT/EP2019/063374
§ 371 (c)(1),
(2) Date: Dec. 1, 2020

(87) PCT Pub. No.: WO2019/228910
PCT Pub. Date: Dec. 5, 2019

(65) Prior Publication Data
US 2021/0216056 A1 Jul. 15, 2021

(30) Foreign Application Priority Data
Jun. 1, 2018 (EP) .................................. 18175553

(51) Int. Cl.
*G05B 19/04* (2006.01)
*G05B 19/042* (2006.01)
*G05B 19/05* (2006.01)

(52) U.S. Cl.
CPC ....... *G05B 19/0426* (2013.01); *G05B 19/056* (2013.01); *G05B 2219/13125* (2013.01); *G05B 2219/13185* (2013.01)

(58) Field of Classification Search
CPC ........... G05B 2219/13125; G05B 2219/13185; G05B 19/056; G06F 9/455
See application file for complete search history.

(56) References Cited

U.S. PATENT DOCUMENTS

2015/0081267 A1* 3/2015 Conroy ............ G05B 19/41885
703/21
2015/0242548 A1 8/2015 Jones et al.
(Continued)

FOREIGN PATENT DOCUMENTS

CN 103238143 A 8/2013
DE 202015103287 U1 8/2015
(Continued)

OTHER PUBLICATIONS

International Search Report and Written Opinion corresponding to PCT/EP2019/063374, dated Aug. 22, 2019.
(Continued)

*Primary Examiner* — Jacob Petranek
(74) *Attorney, Agent, or Firm* — Barnes & Thornburg LLP

(57) ABSTRACT

A programmable logic controller, a method for operating a programmable logic controller, and a computer program product provide for parallel operation of a plurality of PLC applications on a programmable logic controller. The programmable logic controller has a data processing unit, at least one input, at least one output, and at least one storage region for application programs, wherein the programmable logic controller is configured to provide at least one virtual programmable logic controller during operation by means of (Continued)

an operating system, wherein an application program is able to be run on the virtual programmable logic controller.

11 Claims, 2 Drawing Sheets

(56) References Cited

U.S. PATENT DOCUMENTS

| | | |
|---|---|---|
| 2015/0248506 A1 | 9/2015 | Hartley |
| 2016/0033962 A1 | 2/2016 | Cote |
| 2016/0197778 A1* | 7/2016 | Jones .................... G06F 16/951 709/222 |
| 2018/0004182 A1* | 1/2018 | Miyachi ............... G05B 19/052 |
| 2019/0095246 A1* | 3/2019 | Nakano ................ G05B 19/052 |
| 2019/0265668 A1* | 8/2019 | Kuya .................... G05B 19/05 |
| 2021/0042143 A1* | 2/2021 | Miyamaru ............. G06F 9/544 |

FOREIGN PATENT DOCUMENTS

| | | |
|---|---|---|
| EP | 2790101 A1 | 10/2014 |
| EP | 2985663 A1 | 2/2016 |
| EP | 3104234 A1 | 12/2016 |
| EP | 3273314 A1 | 1/2018 |
| WO | 2012072179 A1 | 6/2012 |
| WO | 2014051579 A1 | 4/2014 |
| WO | 2014204635 A1 | 12/2014 |
| WO | 2015010751 A1 | 1/2015 |
| WO | 2015124320 A1 | 8/2015 |

OTHER PUBLICATIONS

Chinese Office Action corresponding to CN 201980036870.5 dated Mar. 28, 2024.
Chinese Office Action corresponding to CN201980036870.5 dated Nov. 1, 2023.

* cited by examiner

VIRTUALIZED PROGRAMMABLE LOGIC CONTROLLERS TO ALLOW MULTIPLE APPLICATIONS TO RUN IN PARALLEL ON THE SAME HARDWARE

CROSS REFERENCE AND PRIORITY CLAIM

This patent application is a U.S. National Phase of International Patent Application No. PCT/EP2019/063374 filed May 23, 2019, which claims priority to European Patent Application No. 18175553.9, the disclosure of which being incorporated herein by reference in their entireties.

FIELD

The present disclosure relates to a programmable logic controller, a method for operating a programmable logic controller and a computer program product. In particular, the disclosure relates to a programmable logic controller and an operating method for a programmable logic controller for the parallel operation of a multiplicity of PLC applications on a programmable logic controller.

BACKGROUND

PLCs (programmable logic controllers) are often used in automation engineering today. A PLC, depicted by way of illustration in FIG. 1, is an electronic data processing apparatus 2 having one or more inputs 10a, 10b, 10c that are fed from sensors, such as light barriers or temperature sensors, one or more outputs 20a, 20b, 20c that feed actuators, such as for example contactors for switching on electric motors and valves, a data processing unit 4, an operating system ("firmware") for the data processing unit, a memory area for user programs ("application") 8a, 8b, 8c and an interface 40 for data transmission. When supplied with power the operating system renders the programmable logic controller ready for operation and permits the transmission of a user program to the programmable logic controller via the interface. In a work cycle controlled by the operating system a defined map of the input states 10a, 10b, 10c is captured at one time and processed by the user program, and the input state map and the user program are taken as a basis for producing a map of the desired output states 20a, 20b, 20c. At the end of the cycle the outputs 20a, 20b, 20c are switched in accordance with the map. The user program is programmed by an end user of the programmable logic controller, normally using a programming language according to IEC 61131.

SUMMARY

The present disclosure is directed at providing a method, a programmable logic controller, a method for operating a programmable logic controller and a computer program product that permit system complexity and costs to be reduced.

BRIEF DESCRIPTION OF FIGURES

An exemplary embodiment of the method according to the present disclosure is explained on the basis of the figures presented below. In this case, the exemplary embodiment is provided as an illustrative implementation of the method according to the disclosure that does not limit the subject of the inventive disclosure as defined in the claims.

DETAILED DESCRIPTION

Figure 1:
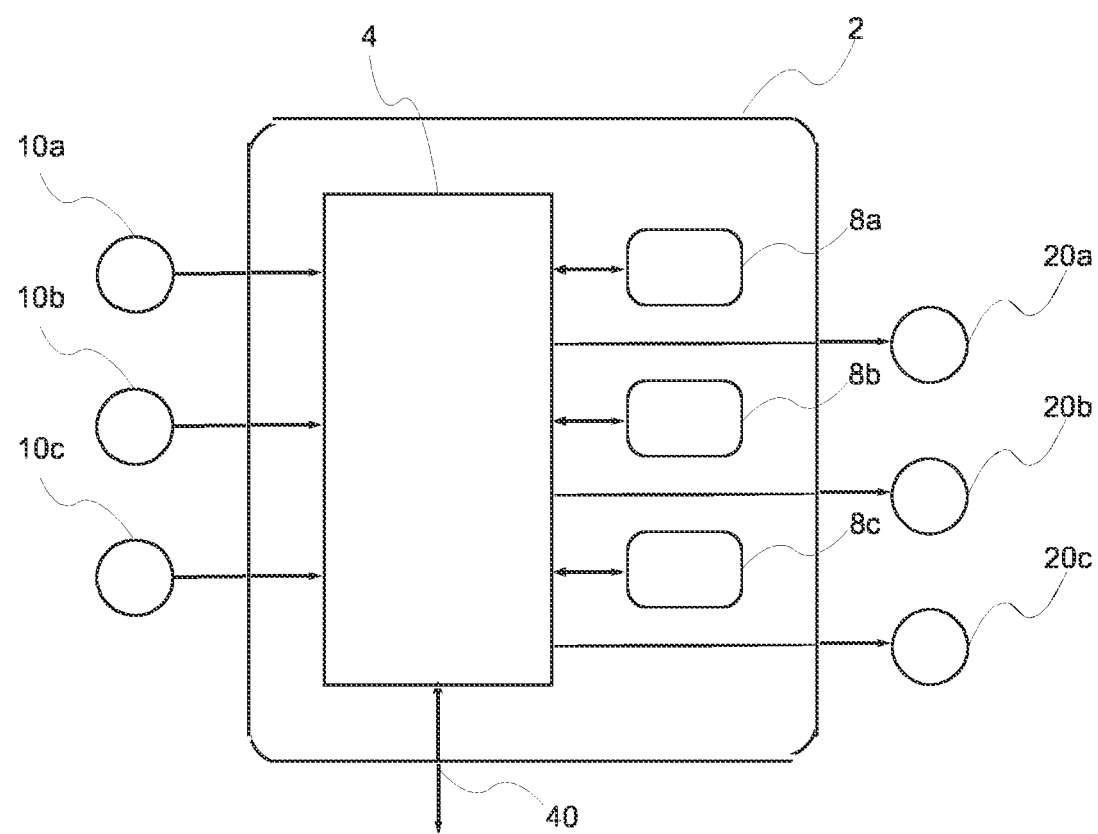
FIG. 1 shows a programmable logic controller from the prior art.

For modern programmable logic controllers the connection of the programmable logic controller to the sensors and actuators is increasingly no longer made via discrete lines, but rather is made via a field bus, for example according to IEC 61158. Furthermore, parts of the programmable logic controller such as input and output modules are increasingly also connected to a central data processing unit by means of bus systems.

Modern programmable logic controllers permit parallel performance of multiple PLC cycles (multitasking, one cycle corresponds to one task). This allows separate implementation of different tasks. Each task can have a different cycle time and a different safety level (SIL level). However, this parallel performance of cycles presupposes that they were created using the same versions of the development environments and the same software libraries, which ultimately equates to their being created in the same development environment.

In complex environments, however, it is customary for different functions or subsystems to be developed and supplied by different companies. In rail vehicle combinations, for example, it is not unusual for the subsystem of the train controller to be supplied by one company and for the subsystem of the brake controller to be supplied by another company, for example. Since the level of coordination effort between the companies involved is high in the event of cross-system use of one programmable logic controller in such an environment, a separate programmable logic controller is normally used for each subsystem or at least for the subsystems supplied by one company in the prior art.

This increases system complexity and costs.

The present disclosure is therefore based on the object of providing a method, a programmable logic controller, a method for operating a programmable logic controller and a computer program product that permit system complexity and costs to be reduced.

The disclosure relates to a programmable logic controller that has: a data processing unit, at least one input, at least one output, at least one memory area for application programs, wherein the programmable logic controller is designed so as, during operation by means of an operating system, to provide at least one virtual programmable logic controller on which an application program is able to run.

The programmable logic controller may have a second memory area for application programs, and is designed so as, during operation by means of the operating system, to provide a second programmable logic controller, wherein the first virtual programmable logic controller and the second virtual programmable logic controller can each run an application program in parallel and in a manner encapsulated from one another.

The programmable logic controller may be designed to simulate a virtual field bus that serves as interface between the at least one virtual programmable logic controller and the second virtual programmable logic controller.

The disclosure relates to the programmable logic controller, wherein the connection of the programmable logic controller to the sensors or actuators may be made via a field bus.

The disclosure relates to the programmable logic controller, wherein the connection of the data processing unit (4) to input modules or output modules may be made via a bus system.

The disclosure relates to a method for operating a programmable logic controller that has the steps of: apportioning the resources of a programmable logic controller to at least one virtual programmable logic controller, and executing at least one application program on the virtual programmable logic controller.

The method for operating a programmable logic controller may involve the resources being apportioned to at least two virtual programmable logic controllers and at least two application programs being executed on the at least two virtual programmable logic controllers.

The method for operating a programmable logic controller may involve the application programs being configured independently of one another.

The method for operating a programmable logic controller may involve the virtual programmable logic controllers being programmed independently of one another.

The method may also include simulating a virtual field bus, wherein the at least two virtual programmable logic controllers can communicate with one another via the virtual field bus.

Figure 2:
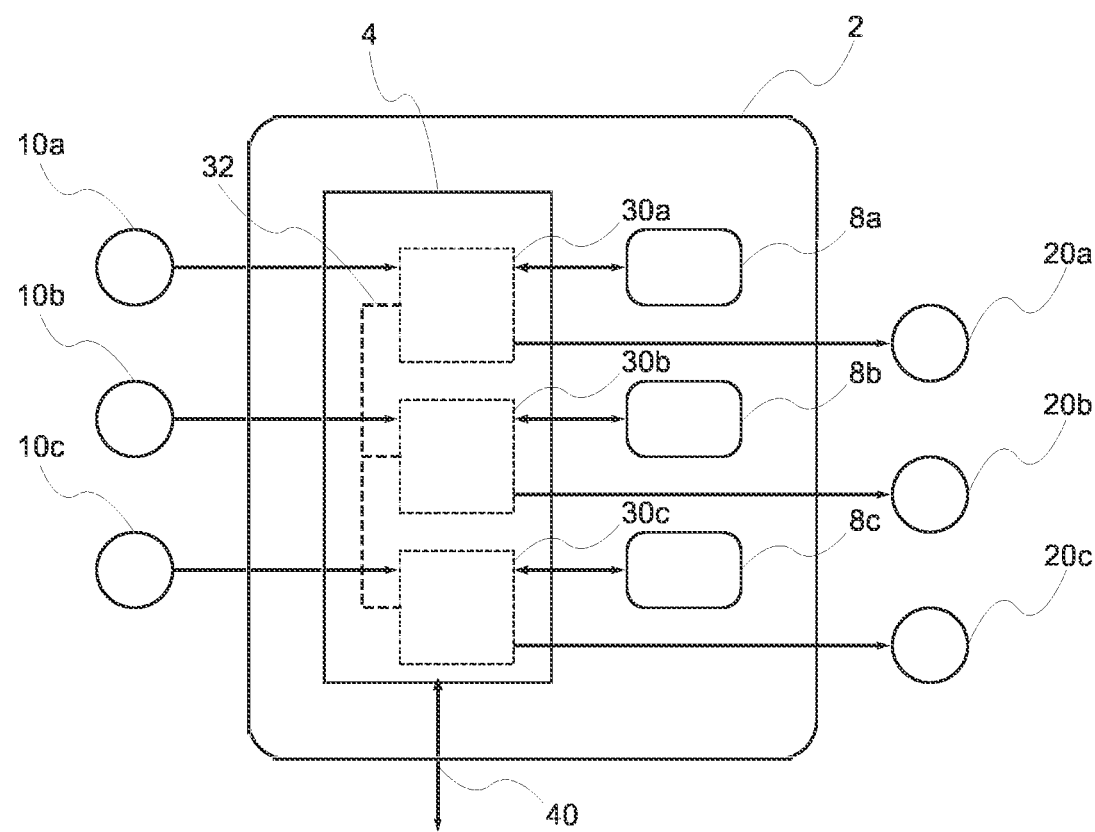
FIG. 2 shows a programmable logic controller according to an exemplary embodiment of the present disclosure.

FIG. 2 shows an exemplary embodiment of a programmable logic controller 2 according to the disclosure that has a data processing unit 4 (CPU) and memory areas 8a, 8b, 8c for multiple application programs. The programmable logic controller 2 also has an interface 40.

The programmable logic controller 2 also has inputs 10a, 10b, 10c. The inputs 10a, 10b, 10c can have input signals applied to them. The inputs 10a, 10b, 10c may have external sensors (not shown), such as light barriers, tacho generators or temperature sensors, connected to them.

The programmable logic controller 2 also has outputs 20a, 20b, 20c. The outputs 20a, 20b, 20c can have output signals applied to them by the programmable logic controller 2. The outputs 20a, 20b, 20c may have external actuators (not shown), such as contactors for switching on electric motors and valves, connected to them.

The programmable logic controller 2 is provided with an operating system ("firmware") that, when supplied with power, renders the programmable logic controller ready for operation and permits the transmission of the user programs to the memory areas 8a, 8b, 8c of the programmable logic controller 2 via the interface 40. The programmable logic controller permits parallel performance of multiple tasks.

Furthermore, the operating system provides an abstraction layer that permits parallel operation of multiple virtual programmable logic controllers 30a, 30b, 30c. In this case the programmable logic controller 2 uses the operating system to simulate one or more virtual programmable logic controllers 30a, 30b, 30c via one or more tasks. The virtual programmable logic controllers each provide an application program with interfaces and resources in the form that the application program can access these interfaces and resources as if the application program were executed directly on the programmable logic controller 2 and not in a virtual programmable logic controller 30a, 30b, 30c. Since the virtual programmable logic controllers 30a, 30b, 30c simulate a self-contained programmable logic controller, the application programs 8a, 8b, 8c are encapsulated from one another when executed and cannot directly influence one another. This permits parallel operation of multiple application programs, which are merely adapted for running on one specific programmable logic controller. The encapsulation in the virtual programmable logic controllers means that it is not necessary for the application programs to need further adjustments for one another, such as the same version or the use of the same software libraries. All of the virtual programmable logic controllers can be used and programmed independently of one another. From the point of view of the application program, the virtual programmable logic controller does not differ from a conventional programmable logic controller. Each application program is executed via a separate virtual programmable logic controller 30a, 30b, 30c. The application program can therefore be developed in a normal manner, with the interfaces between the different systems remaining unchanged. In a work cycle controlled by the operating system a defined map of the input states 10a, 10b, 10c is captured at one time and processed by the user program, and the input state map and the user program are taken as a basis for producing a map of the desired output states 20a, 20b, 20c. At the end of the cycle the outputs 20a, 20b, 20c are switched in accordance with the map. The user program is programmed by an end user of the programmable logic controller, normally using a programming language according to IEC 61131.

The operating system on the programmable logic controller simulates a virtual field bus 32 according to IEC 61158, which serves as interface between the virtual programmable logic controllers 30a, 30b, 30c.

It is thus possible to execute different application programs for different subsystems on a single programmable logic controller 2 independently of one another. For example the function of the vehicle controller and the function of the brake control computer of a rail vehicle combination can thus be executed together on one programmable logic controller, even if they are provided by different manufacturers.

This concept allows PLC applications for different subsystems to be executed on a single piece of hardware independently of one another. As an example, the function of the vehicle controller and the function of the brake computer can be executed together on one piece of hardware. The PLC applications can be developed customarily and the interfaces between the different subsystems remain the same.

The advantages of the concept of the present disclosure are therefore that multiple PLC applications can be executed on one piece of hardware without this requiring the design of the PLC applications to be adapted.

For the programmable logic controller 2 the connection of the programmable logic controller 2 to the sensors and actuators can be made not only via discrete lines but also via a field bus, for example according to IEC 61158.

Furthermore, parts of the programmable logic controller 2 such as input and output modules can also be connected to the central data processing unit 4 by means of bus systems.

In the exemplary embodiment the programmable logic controller 2 has a data processing unit 4 (CPU). Alternatively, the programmable logic controller from the exemplary embodiment can have multiple data processing units, in particular two, four or eight data processing units. In this case the multiple virtual programmable logic controllers are distributed over the data processing units.

Further variations of the disclosure within the scope of the patent claims are possible.

The sentential connectives . . . "and", "or" and "either . . . or" are used in the meaning based on the logical conjunction, the logical adjunction (often "and/or") or the logical anticoincidence.

LIST OF REFERENCE SIGNS

2 PLC hardware
4 CPU 8a, 8b, 8c PLC application
10a, 10b, 10c input
20a, 20b, 20c output
30a, 30b, 30c virtual programmable logic controller
32 virtual field bus
40 interface

The invention claimed is:

1. A programmable logic controller comprising:
a data processing unit
at least one input,
at least one memory area for application programs, wherein the programmable logic controller is configured to, during operation by an operating system, provide at least one virtual programmable logic controller including a first virtual programmable logic controller on which an application program is to run,
a second memory area for application programs,
wherein the programmable logic controller is configured to, during operation by the operating system, provide a second virtual programmable logic controller,
wherein the operating system renders the programmable logic controller ready for operation to permit transmission of the application programs from resources outside the programmable logic controller to the first and second memory areas via an interface of the programmable logic controller,
wherein the first virtual programmable logic controller and the second virtual programmable logic controller each run an application program in parallel and encapsulated from one another, and are used and programmed independently of each other, and wherein each of the first virtual programmable logic controller and the second virtual programmable logic controller are independently connected to a first output and a second output of the programmable logic controller, and
wherein the programmable logic controller is further configured to simulate a virtual field bus that serves as interface between the at least one virtual programmable logic controller and the second virtual programmable logic controller, and provide a connection of the programmable logic controller to the at least one input and at least one output.

2. The programmable logic controller of claim 1, wherein a field bus provides a connection of the programmable logic controller at least one input and at least one output in the form of sensors or actuators.

3. A method for operating a programmable logic controller, the method comprising:
apportioning the resources of a programmable logic controller to at least one virtual programmable logic controller, and
executing at least one application program on the at least one virtual programmable logic controller, wherein the resources are apportioned to at least two virtual programmable logic controllers and at least two application programs are executed on the at least two virtual programmable logic controllers, wherein each of the two virtual programmable logic controllers are independently connected to one of a first output and a second output of the programmable logic controller, and
simulating a virtual field bus, wherein the at least two virtual programmable logic controllers, at least one input, and at least one output, communicate with one another via a virtual field bus,
wherein a programmable logic controller operating system renders the programmable logic controller ready for operation to permit transmission of the at least two application programs from resources outside the programmable logic controller to first and second memory areas via an interface of the programmable logic controller.

4. The method for operating a programmable logic controller of claim 3, wherein the application programs are configured independently of one another.

5. The method of claim 3, wherein the at least two virtual programmable logic controllers are programmed independently of one another.

6. A non-transitory computer program product including instructions which, when performed on a computer, control a programmable logic controller to provide the programmable logic controller of claim 1.

7. The non-transitory computer program product of claim 6, wherein resources of the programmable logic controller are apportioned to the at least one virtual programmable logic controller, and at least one application program is executed on the at least one virtual programmable logic controller.

8. The non-transitory computer program product of claim 7, wherein the resources are apportioned to at least two virtual programmable logic controllers and at least two application programs are executed on the at least two virtual programmable logic controllers.

9. The non-transitory computer program product of claim 7, wherein the application programs are configured independently of one another.

10. The non-transitory computer program of claim 8, wherein the at least two virtual programmable logic controllers are programmed independently of one another.

11. The non-transitory computer program product of claim 8, wherein a virtual field bus is simulated, wherein the at least two virtual programmable logic controllers communicate with one another via a virtual field bus.

* * * * *